United States Patent
Zeitler et al.

(10) Patent No.: US 7,418,517 B2
(45) Date of Patent: Aug. 26, 2008

(54) METHODS AND APPARATUS FOR DISTRIBUTING SYSTEM MANAGEMENT SIGNALS

(75) Inventors: Carl Zeitler, Tomball, TX (US); David Brian Glasco, Austin, TX (US); Les Record, Round Rock, TX (US); Richard R. Oehler, Somers, TX (US); William G. Kulpa, Lakeway, TX (US); Guru Prasadh, Austin, TX (US); Rajesh Kota, Austin, TX (US)

(73) Assignee: Newisys, Inc., Austin, TX (US)

( * ) Notice: Subject to any disclaimer, the term of this patent is extended or adjusted under 35 U.S.C. 154(b) by 744 days.

(21) Appl. No.: 10/356,393

(22) Filed: Jan. 30, 2003

(65) Prior Publication Data

US 2004/0153507 A1 Aug. 5, 2004

(51) Int. Cl.
*G06F 15/173* (2006.01)
(52) U.S. Cl. .................. 709/238; 709/201; 709/208; 709/229; 709/238; 711/141
(58) Field of Classification Search ............... 709/201, 709/208, 229, 238, 205, 220; 370/254; 711/141
See application file for complete search history.

(56) References Cited

U.S. PATENT DOCUMENTS

| | | | | |
|---|---|---|---|---|
| 4,783,687 A * | 11/1988 | Rees | ............................. | 355/1 |
| 5,561,768 A | 10/1996 | Smith | ........................ | 395/200.1 |
| 5,623,644 A * | 4/1997 | Self et al. | .................... | 709/234 |
| 5,692,123 A | 11/1997 | Logghe | | |
| 5,781,187 A * | 7/1998 | Gephardt et al. | ............. | 710/309 |
| 6,081,874 A * | 6/2000 | Carpenter et al. | ........... | 711/141 |
| 6,167,492 A | 12/2000 | Keller et al. | ................. | 711/154 |
| 6,219,775 B1 | 4/2001 | Wade et al. | .................... | 712/11 |
| 6,370,585 B1 * | 4/2002 | Hagersten et al. | ........... | 709/238 |
| 6,385,705 B1 | 5/2002 | Keller et al. | ................. | 711/154 |
| 6,463,529 B1 | 10/2002 | Miller et al. | | |
| 6,467,007 B1 | 10/2002 | Armstrong et al. | | |
| 6,490,661 B1 | 12/2002 | Keller et al. | ................. | 711/150 |
| 6,820,174 B2 * | 11/2004 | Vanderwiel | ................. | 709/213 |

(Continued)

FOREIGN PATENT DOCUMENTS

EP 0978781 2/2000

(Continued)

OTHER PUBLICATIONS

PCT Application No. PCT/US03/34834, Int'l Filing Date: Oct. 30, 2003 PCT Search Report mailed Feb. 25, 2005.

(Continued)

*Primary Examiner*—Ramy M Osman
(74) *Attorney, Agent, or Firm*—Weaver Austin Villeneuve & Sampson, LLP

(57) ABSTRACT

Methods and apparatus are provided for improving the distribution of system management signals within a computer system complex. Mechanisms are provided for transmission both within a box and between computer system boxes. Local routing tables and general routing tables allow the distribution of system management signals precisely to resources associated with particular partitions. Signals are sequenced to put resources associated with one or more boxes in the appropriate states. The distribution of signals between boxes in the computer system complex can be accomplished with the use of a dedicated wire.

37 Claims, 13 Drawing Sheets

U.S. PATENT DOCUMENTS

| | | | |
|---|---|---|---|
| 6,977,908 B2 * | 12/2005 | de Azevedo et al. | 370/254 |
| 7,065,599 B2 * | 6/2006 | King et al. | 709/220 |
| 7,103,636 B2 * | 9/2006 | Glasco | 709/216 |
| 7,155,525 B2 * | 12/2006 | Glasco et al. | 709/229 |
| 7,251,698 B2 * | 7/2007 | Glasco et al. | 709/237 |
| 7,281,055 B2 * | 10/2007 | Glasco et al. | 709/238 |
| 2001/0037435 A1 | 11/2001 | Van Doren | |
| 2002/0004915 A1 | 1/2002 | Fung | |
| 2002/0007463 A1 | 1/2002 | Fung | |
| 2004/0260832 A1 * | 12/2004 | Kota et al. | 709/238 |

FOREIGN PATENT DOCUMENTS

| | | |
|---|---|---|
| WO | WO0239242 | 5/2002 |

OTHER PUBLICATIONS

Int'l Search Report from PCT/US03/34687, Int'l filing date Oct. 30, 2003, Search report mailed Aug. 17, 2004.

D. E. Culler, J. P. Singh, A. Gupta, "Parallel Computer Architecture", 1999 Morgan Kaufmann, San Francisco, CA USA XP002277658.

Andrew Tanenbaum, "Computer Networks", Computer Networks, London: Prentice Hall International, GB, 1996, pp. 345-403, XP002155220.

Int'l Search Report from PCT/US03/34687, Int'l filing date Oct. 30, 2003, Search report mailed May 28, 2004.

Final Office Action, U.S. Appl. No. 10/300,408, Mailed Oct. 16, 2007.

* cited by examiner

| Partition Number | Box 0 Slot # | Box 0 Eth'net Addrss | Box 0 I2C Addrss | Box 1 Slot # | Box 1 Eth'net Addrss | Box 1 I2C Addrss | Box 2 Slot # | Box 2 Eth'net Addrss | Box 2 I2C Addrss | Box 3 Slot # | Box 3 Eth'net Addrss | Box 3 I2C Addrss |
|---|---|---|---|---|---|---|---|---|---|---|---|---|
| 0 | 0, self | - | - | | | | | | | | | |
| 1 | 1, self | - | - | | | | | | | | | |
| 2 | 2, self | - | - | | | | | | | | | |
| 3 | | | | 0 | x | Alt x | 0 | x | Alt x | 0 | x | Alt x |
| 4 | | | | 1 | x | Alt x | | | | | | |

Box 0 Local Reset Routing Matrix 701

|  | In | | | | Out | | | | |
|---|---|---|---|---|---|---|---|---|---|
| Partition Number Info/Slot Number | I/O Hub1 Action Gen | I/O Hub 3 Action Gen | Service Procssr Action Gen | I2C Action Gen | I0 | P1 | P2 | I3 | H |
| 0 |  |  | X | X |  |  | X |  |  |
| 1 | X |  | X | X | X | X |  |  |  |
| 2 |  |  | X | X |  |  |  | X | X |
| 3 |  |  |  |  |  |  |  |  |  |

- 703: row 0
- 705: row 1
- 707: row 2
- 709: row 3

Box 1 Local Reset Routing Matrix 711

|  | In | | | | Out | | | | |
|---|---|---|---|---|---|---|---|---|---|
| Partition Number Info/Slot Number | I/O Hub1 Action Gen | I/O Hub 3 Action Gen | Service Procssr Action Gen | I2C Action Gen | I0 | P1 | P2 | I3 | H |
| 0 | X |  | X | X | X | X | X |  | X |
| 1 |  | X | X | X |  |  |  | X |  |
| 2 |  |  |  |  |  |  |  |  |  |
| 3 |  |  |  |  |  |  |  |  |  |

- 713: row 0
- 715: row 1
- 717: row 2
- 719: row 3

Fig. 7B

Box 2 Local Reset Routing Matrix 721

| | In | | | | Out | | | | |
|---|---|---|---|---|---|---|---|---|---|
| Partition Number Info/Slot Number | I/O Hub1 Action Gen | I/O Hub 3 Action Gen | Service Procssr Action Gen | I2C Action Gen | I0 | P1 | P2 | I3 | H |
| 0 | | | X | X | X | X | X | X | X |
| 1 | | | | | | | | | |
| 2 | | | | | | | | | |
| 3 | | | | | | | | | |

723 — row 0
725 — row 1
727 — row 2
729 — row 3

Box 3 Local Reset Routing Matrix 731

| | In | | | | Out | | | | |
|---|---|---|---|---|---|---|---|---|---|
| Partition Number Info/Slot Number | I/O Hub1 Action Gen | I/O Hub 3 Action Gen | Service Procssr Action Gen | I2C Action Gen | I0 | P1 | P2 | I3 | H |
| 0 | | X | X | X | X | X | X | X | X |
| 1 | | | | | | | | | |
| 2 | | | | | | | | | |
| 3 | | | | | | | | | |

733 — row 0
735 — row 1
737 — row 2
739 — row 3

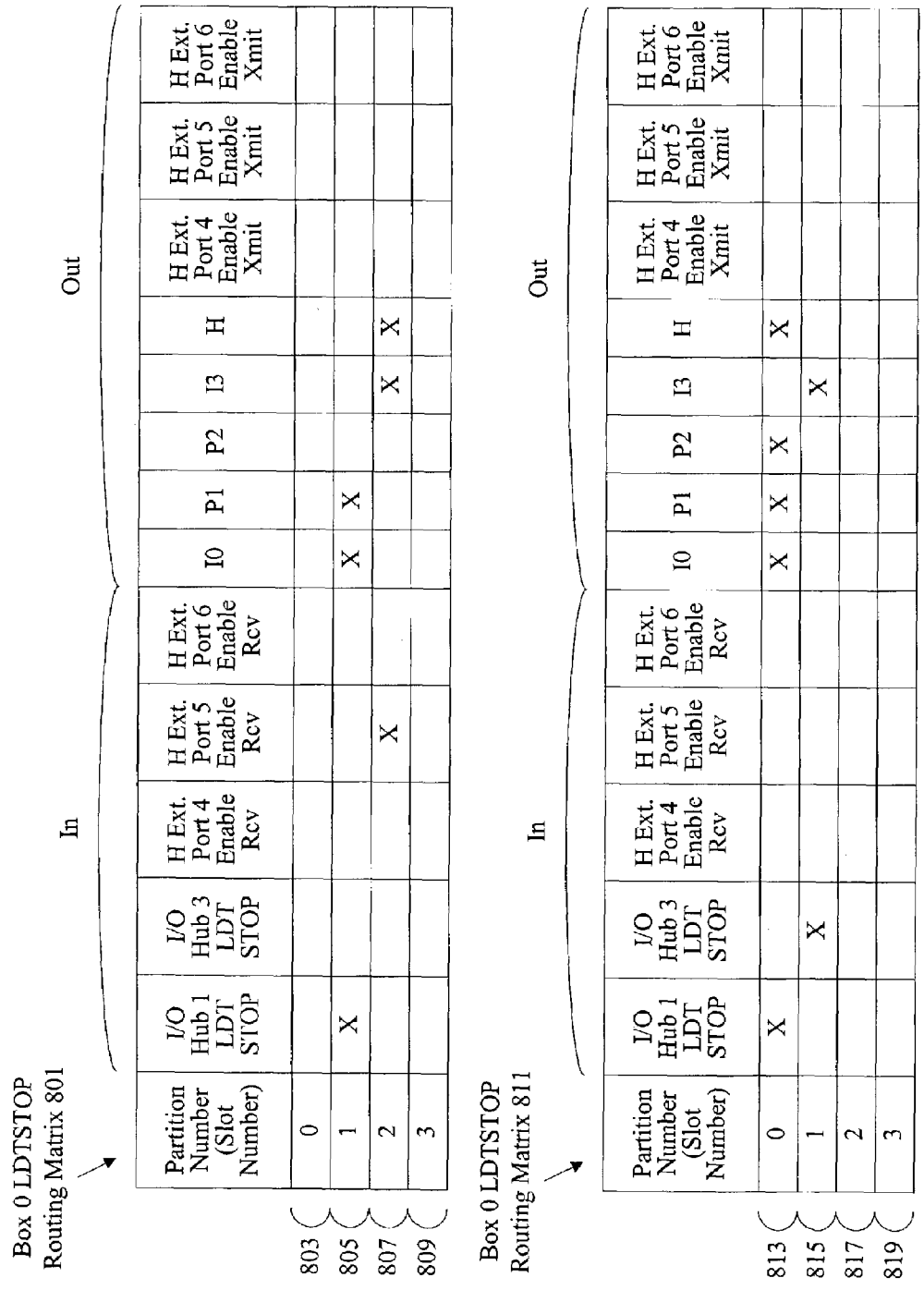

Fig. 8B

Box 0 LDTSTOP Routing Matrix 821

| Partition Number (Slot Number) | In | | | | | Out | | | | | | | |
|---|---|---|---|---|---|---|---|---|---|---|---|---|---|
| | I/O Hub 1 LDT STOP | I/O Hub 3 LDT STOP | H Ext. Port 4 Enable Rcv | H Ext. Port 5 Enable Rcv | H Ext. Port 6 Enable Rcv | I0 | P1 | P2 | I3 | H | H Ext. Port 4 Enable Xmit | H Ext. Port 5 Enable Xmit | H Ext. Port 6 Enable Xmit |
| 0 | | | | | X | X | X | X | X | X | | | |
| 1 | | | - | | | | | | | | | | |
| 2 | | | - | | | | | | | | | | |
| 3 | | | - | | | | | | | | | | |

Box 0 LDTSTOP Routing Matrix 831

| Partition Number (Slot Number) | In | | | | | Out | | | | | | | |
|---|---|---|---|---|---|---|---|---|---|---|---|---|---|
| | I/O Hub 1 LDT STOP | I/O Hub 3 LDT STOP | H Ext. Port 4 Enable Rcv | H Ext. Port 5 Enable Rcv | H Ext. Port 6 Enable Rcv | I0 | P1 | P2 | I3 | H | H Ext. Port 4 Enable Xmit | H Ext. Port 5 Enable Xmit | H Ext. Port 6 Enable Xmit |
| 0 | | X | | | | X | X | X | X | X | | X | X |
| 1 | | | - | | | | | | | | | | |
| 2 | | | - | | | | | | | | | | |
| 3 | | | - | | | | | | | | | | |

METHODS AND APPARATUS FOR DISTRIBUTING SYSTEM MANAGEMENT SIGNALS

CROSS-REFERENCE TO RELATED APPLICATIONS

The present application is related to U.S. Application Ser. Nos. 10/157,384, 10/156,893, and 10/157,409 titled Transaction Management In Systems Having Multiple Multi-Processor Clusters, Routing Mechanisms In Systems Having Multiple Multi-Processor Clusters, and Address Space Management In Systems Having Multiple Multi-Processor Clusters respectively, all by David B. Glasco, Carl Zeitler, Rajesh Kota, Guru Prasadh, and Richard R. Oehler, the entireties of which are incorporated by reference for all purposes. The present application is also related to U.S. application Ser. No. 10/300,408, filed Nov. 19, 2002 titled Method And Apparatus For Distributing System Management Signals.

BACKGROUND OF THE INVENTION

1. Field of the Invention

The present invention generally relates to distributing system management signals in a computer system. More specifically, the present invention provides techniques for distributing system management signals precisely to designated resources, such as the resources in a partition.

2. Description of Related Art

A relatively new approach to the design of multi-processor systems replaces broadcast communication among processors with a point-to-point data transfer mechanism in which the processors communicate similarly to network nodes in a tightly-coupled computing system. In typical implementations, groups of resources or computer system boxes can be interconnected to form a cluster or a computer system complex. Multiple partitions can then run on top of the computer system complex.

However, mechanisms for distributing system management signals are limited. Consequently, it is desirable to provide techniques for improving system management signal distribution in systems having multiple clusters of multiple interconnected processors.

SUMMARY OF THE INVENTION

Methods and apparatus are provided for improving the distribution of system management signals within a computer system complex. Mechanisms are provided for transmission both within a box and between computer system boxes. Local routing tables and general routing tables allow the distribution of system management signals precisely to resources associated with particular partitions. Signals are sequenced to put resources associated with one or more boxes in the appropriate states. The distribution of signals between boxes in the computer system complex can be accomplished with the use of a dedicated wire.

In one embodiment, a computer system is provided. The computer system includes a plurality of local resources and a plurality of remote resources. The plurality of local resources include a local cluster of processors in a local box. The local cluster of processors are interconnected in a point-to-point architecture. The plurality of remote resources include remote clusters of remote processors in remote boxes. The remote clusters of processors are interconnected in point-to-point architectures. One or more lines between the local box and the remote boxes are dedicated to carry substantially only system management signals between the local and remote boxes.

In another embodiment, a method for distributing system management signals is provided. A system management signal is received at a configuration system module associated with a local cluster of processors configured in a point-to-point architecture in a local box. A routing table having partition information associated with the system management signal is referenced. It is determined using the routing table which local resources and remote resources associated with remote boxes should receive the system management signal. The system management signal is distributed to selected local and remote resources using one or more lines dedicated to distributing system management signals.

In yet another embodiment, a method for distributing system management information is provided. A plurality of local components including a local cluster of processors in a local box are identified. The local box is coupled to a remote box having a remote cluster of processors. An instruction to generate a data transport signal is received. A data transport routing table is accessed. The data transport routing table is configured to allow distribution of system management information to resources associated with particular partitions. The data transport signal is forwarded to the remote box through a line substantially dedicated to carrying system management information.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 6 is a diagrammatic representation showing a general routing table.

FIGS. 7A and 7B are diagrammatic representations depicting local routing tables.

FIGS. 8A and 8B are diagrammatic representations depicting LDTSTOP routing tables.

DETAILED DESCRIPTION OF SPECIFIC EMBODIMENTS

Reference will now be made in detail to some specific embodiments of the invention including the best modes contemplated by the inventors for carrying out the invention.

Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multi-processor architectures having point-to-point communication among their processors are suitable for implementing specific embodiments of the present invention.

In the following description, numerous specific details are set forth in order to provide a thorough understanding of the present invention. The present invention may be practiced without some or all of these specific details. Well known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Figure 1A:
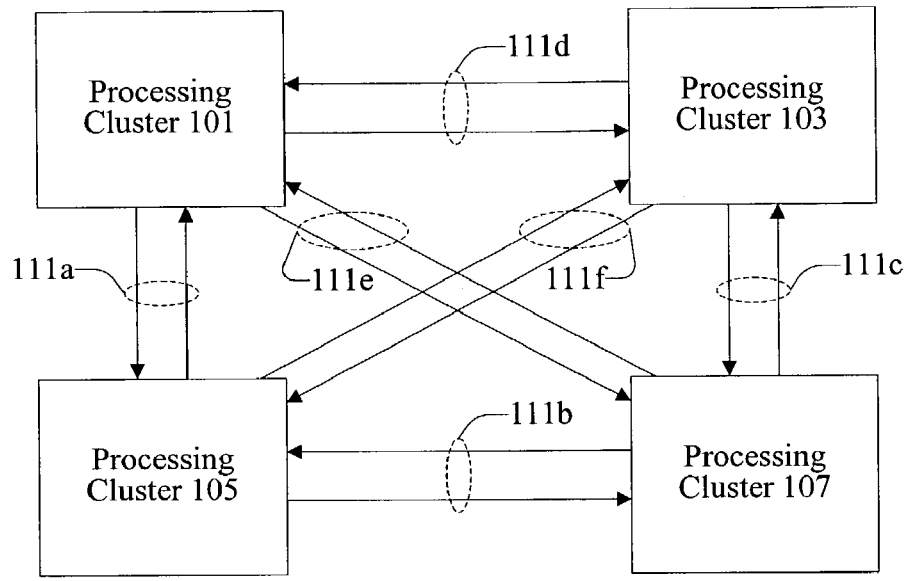
FIGS. 1A and 1B are diagrammatic representation depicting a system having multiple clusters.

FIG. 1A is a diagrammatic representation of one example of a multiple cluster, multiple processor system that may employ the techniques of the present invention. Each processing cluster 101, 103, 105, and 107 includes a plurality of processors. The processing clusters 101, 103, 105, and 107 are connected to each other through point-to-point links 111a-f. The multiple processors in the multiple cluster architecture shown in FIG. 1A share a global memory space. In this example, the point-to-point links 111a-f are internal system connections that are used in place of a traditional front-side bus to connect the multiple processors in the multiple clusters 101, 103, 105, and 107. The point-to-point links may support any point-to-point coherence protocol.

Figure 1B:
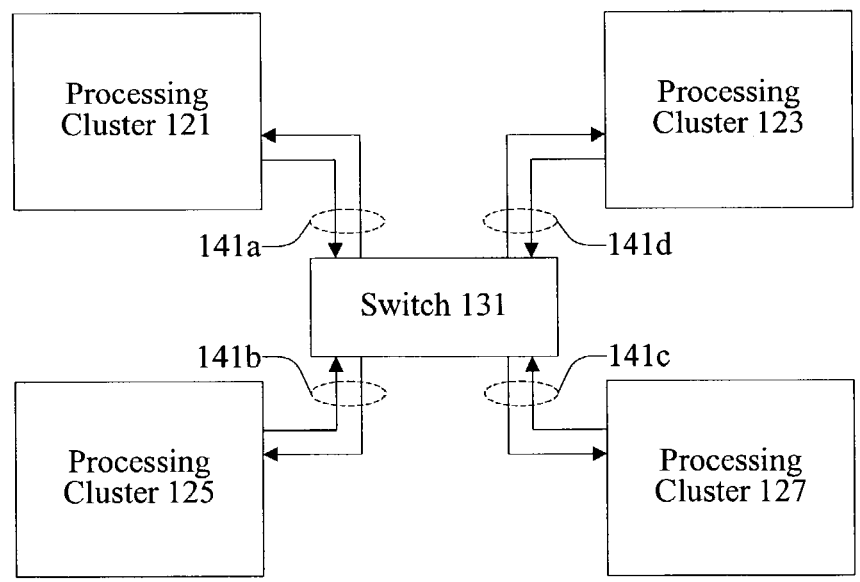

FIG. 1B is a diagrammatic representation of another example of a multiple cluster, multiple processor system that may employ the techniques of the present invention. Each processing cluster 121, 123, 125, and 127 is coupled to a switch 131 through point-to-point links 141a-d. It should be noted that using a switch and point-to-point links allows implementation with fewer point-to-point links when connecting multiple clusters in the system. A switch 131 can include a processor with a coherence protocol interface. According to various implementations, a multi-cluster system shown in FIG. 1A may be expanded using a switch 131 as shown in FIG. 1B.

Figure 2:
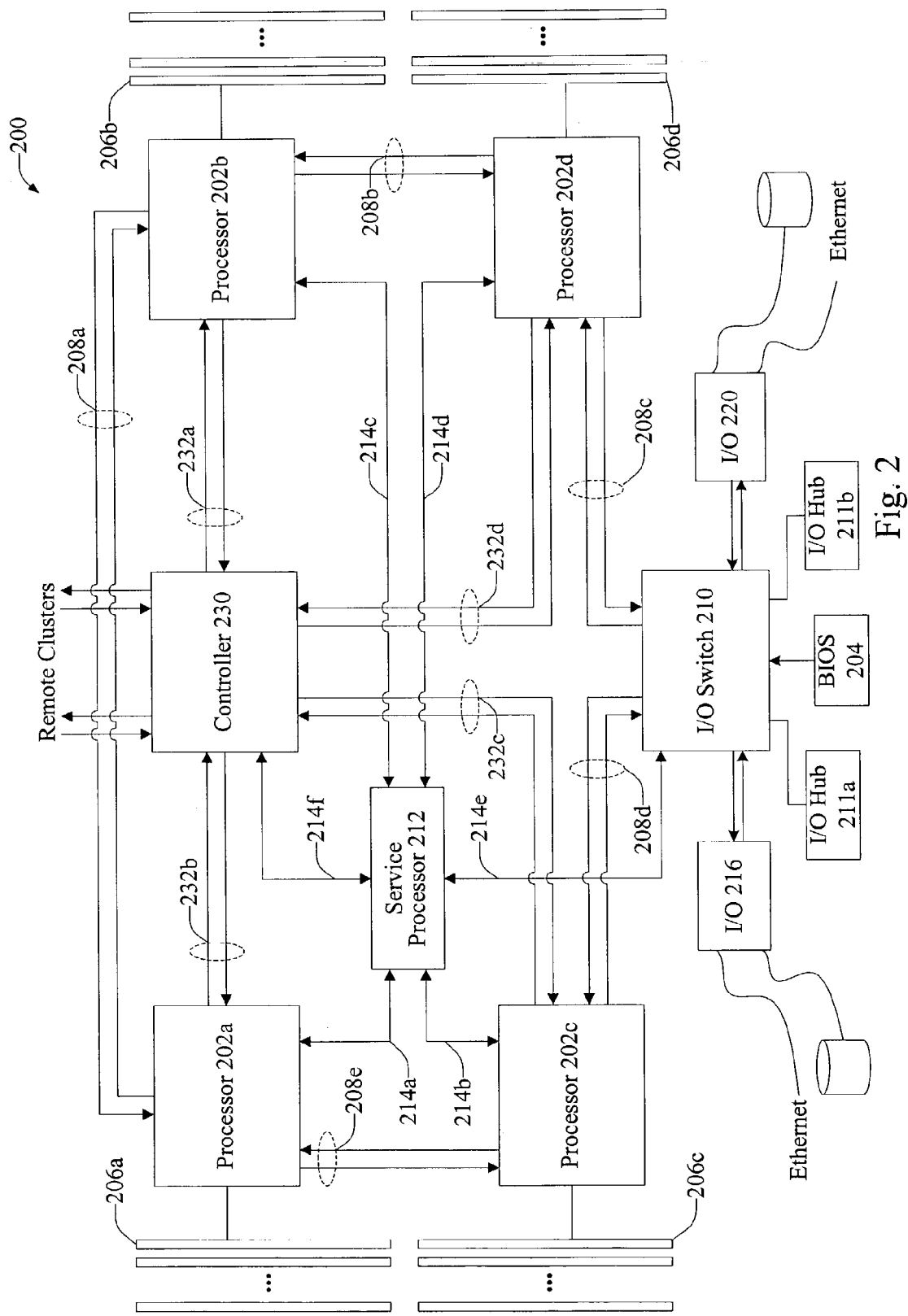
FIG. 2 is a diagrammatic representation of a cluster having a plurality of processors.

FIG. 2 is a diagrammatic representation of a multiple processor cluster such as, for example, cluster 101 shown in FIG. 1A. Cluster 200 includes processors 202a-202d, one or more Basic I/O systems (BIOS) 204, a memory subsystem comprising memory banks 206a-206d, point-to-point communication links 208a-208e, and a service processor 212. The point-to-point communication links are configured to allow interconnections between processors 202a-202d, I/O switch 210, and interconnection controller 230. The service processor 212 is configured to allow communications with processors 202a-202d, I/O switch 210, and interconnection controller 230 via a JTAG interface represented in FIG. 2 by links 214a-214f. The service processor 212 can also be connected to other service processors associated with other boxes. It should be noted that other interfaces are supported. I/O switch 210 connects the rest of the system to I/O adapters 216 and 220.

According to specific embodiments, the service processor of the present invention has the intelligence to partition system resources according to a previously specified partitioning schema. The partitioning can be achieved through direct manipulation of routing tables associated with the resources within a box by the service processor which is made possible by the point-to-point communication infrastructure. The routing tables are used to control and isolate various system resources, the connections between which are defined therein. According to various embodiments, each service processor may also be associated with a configuration system module for directly accessing the routing tables. In one embodiment, the configuration system module is configured to distribute system management signals. Any signal used to manage resources in a computer system complex is referred to herein as a system management signal. Some examples of system management signals include reset and power management signals sent to various nodes. In some examples, a configuration system module is implemented as logic within a service processor or as an entirely separate component.

In typical implementations, a box containing some number of processors includes system management functions that operate on all of the components in the box indiscriminately. For example, a reset signal function distributed by an operating system running on the system would reset all of the components in the box. Similarly, a power management operation instruction for processors to operate in a power conservation mode such as a particular sleep state would result in all processors in that box entering a sleep state. Processors and other resources interconnected having a local bus or point-to-point architecture and using read and write operations for data transfer are referred to herein as residing within a box. Boxes are connected together by controllers for data transfer. Messaging types associated with the interfaces are used for out-of-band communication between boxes.

According to various embodiments, the techniques of the present invention allow the controlling of system management functions such that only selected nodes or resources are the target of the system management functions. The techniques of the present invention also provide mechanisms for distributing system management signals to other boxes through existing links and dedicated wires. Logic or mechanisms for distributing management signals to resources such as processors and I/O components are referred to herein as configuration system modules. Any mechanism or signal used to convey power management or system management information to other processors in a multiple processor system are referred to herein as a data transport signal. In one example, a data transport signal is a power management signal such as data transport stop signal that enables or disables links during system state transitions or a data transport request signal that requests re-enabling of a link for normal operation. Various techniques and mechanisms of the present invention are described with reference to the Lightning Data Transport Stop (LDTSTOP) signal described in the Hyper-Transport I/O Link Specification revision 1.03 released Oct. 10, 2001 and available from the HyperTransport Technology Consortium.

Although the techniques of the present invention will be described with reference to the LDTSTOP signal or Hyper-Transport stop signal, it is contemplated that the techniques of the present invention cover a variety of different power management and system management signals used in a variety of system configurations. System management functions such as reset and power management operations can be distributed to selected resources such as processors 202a-d, controller 230, and I/O switch 210. It will be appreciated that each processor 202a-d shown in FIG. 2 may in fact be a node itself. That is, each processor 202a-d may be a processor node including multiple sub-units. In one example, each node may include resources such as CPUs, memory controllers, and I/O bridges.

The processors 202a-d are coupled to an interconnection controller 230 through point-to-point links 232a-d. According to various embodiments, interconnection controller 230 performs a variety of functions such as the maintenance of a node ID space associated with each of a plurality of processor clusters, communication of interrupts and associated transmissions, and maintenance of cache coherency. Interconnection controller 230 can be coupled to similar controllers associated with other multiprocessor clusters. It should be noted that there can be more than one such interconnection controller in one cluster. Interconnection controller 230 communicates with both processors 202a-d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of cluster 200 will be assumed. For example, most of the resources shown in FIG. 2 are assumed to reside on a single electronic assembly. In addition, memory banks 206a-206d may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet.

According to one embodiment, service processor 212 is a Motorola MPC855T microprocessor that includes integrated chipset functions, and interconnection controller 230 is an Application Specific Integrated Circuit (ASIC) supporting the local point-to-point coherence protocol. Interconnection controller 230 can also be configured to handle a non-coherent protocol to allow communication with I/O devices. In one embodiment, interconnection controller 230 is a specially configured programmable chip such as a programmable logic device or a field programmable gate array. In another embodiment, interconnection controller 230 is a general purpose processor with an interface to point-to-point links 232a-d.

According to various embodiments, I/O switch 210 includes one or more I/O hub components 211a and 211b, corresponding I/O bridges, I/O processors, I/O adapters, and I/O devices or network connections. The I/O hub manages the transition from high speed, very short distance system processor links to the I/O bus. The I/O bus can take on a variety of forms. Some I/O buses, support point-to-point topologies, and can span distances of a mile or more. Other buses, such as the PCI bus, support a parallel data, multi-drop I/O adapter environment over short distances of generally less than one foot. Logic or mechanisms for managing the flow of data to and from various system resources and performing data protocol translation are referred to as I/O hubs.

Figure 3:
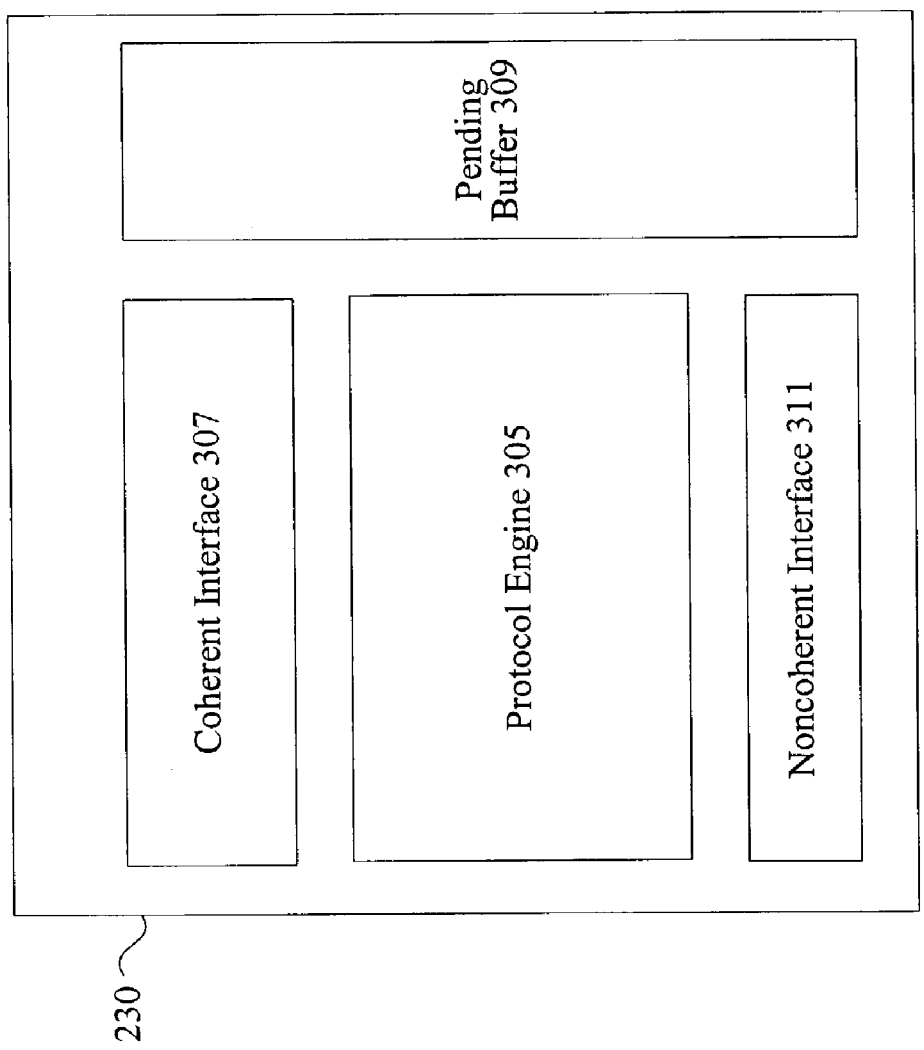
FIG. 3 is a diagrammatic representation of an interconnection controller.

FIG. 3 is a diagrammatic representation of one example of an interconnection controller 230. According to various embodiments, the interconnection controller includes a protocol engine 305 configured to handle packets such as probes and requests received from processors in various clusters of a multiprocessor system. The functionality of the protocol engine 305 can be partitioned across several engines to improve performance.

The protocol engine 305 has access to a pending buffer 309 that allows the interconnection controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information.

The interconnection controller has a coherent protocol interface 307 that allows the interconnection controller to communicate with other processors in the cluster as well as external processor clusters. The interconnection controller may also include other interfaces such as a non-coherent protocol interface 311 for communicating with I/O devices. According to various embodiments, each interface 307 and 311 is implemented either as a full crossbar or as separate receive and transmit units using components such as multiplexers and buffers. It should be noted that the interconnection controller 230 does not necessarily need to provide both coherent and non-coherent interfaces. It should also be noted that an interconnection controller 230 in one cluster can communicate with an interconnection controller 230 in another cluster.

Figure 4:
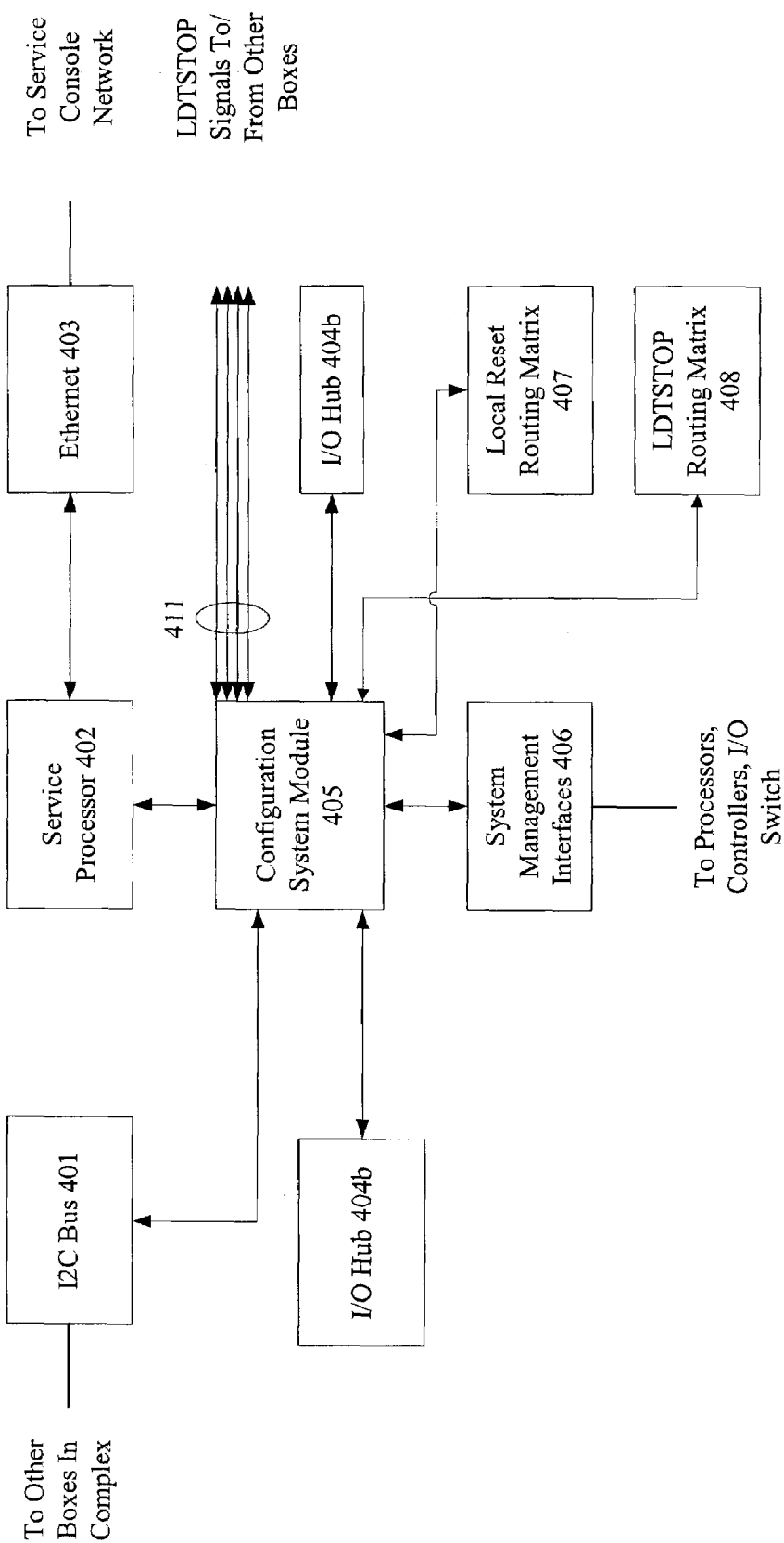
FIG. 4 is a diagrammatic representation of a service processor.

FIG. 4 is a simplified block diagram showing one example of service processor and configuration system module usage. It is important to note that the system management signal distribution mechanism of the present invention could look very different from service processor 212 as depicted above. That is, any mechanism that can intelligently distribute system management requests using the routing tables and a point-to-point communication infrastructure is within the scope of the invention. For example, other possible mechanisms include using one or more of the programmable interface controllers and combinatorial logic to effect the distribution.

According to various embodiments, however, service processor 212 has a direct connection to the configuration system module 405. In some embodiments, the configuration system module also drives and is driven by LDTSTOP signals 411. The service processor communicates with other service processors in the complex using a connection such as an Ethernet connection 403. In one example, an I2C bus 401 connects the configuration system module with the configuration system modules associated with other boxes in the complex. The I2C bus serves as an alternate path in the event of failure of the service processor or its associated Ethernet connection.

The operating system uses various instructions to activate the system management functions provided in I/O hubs 404a and 404b that in turn, are routed to the configuration system module. In addition, the local reset routing matrix 407 and a data transport stop routing matrix such as an LDTSTOP routing matrix 408 serve as input to the logic in the configuration system module to select the target components of the system management action. Any mechanisms indicating which remote cluster resource system or power management signals should be sent to over a physical wire are referred to herein as LDTSTOP routing tables or matrices.

The configuration system module drives the system management interface 406, as a function of the setting in the local routing matrix 407 and LDTSTOP routing matrix 408. The system management interface drives signals such as warm reset, cold reset, LDTSTOP, as well as components such as the power sequencer to turn off power. According to various embodiments, the configuration system module serves as a conduit to write configuration data into the local reset routing matrix 407 and LDTSTOP routing matrix 408 from the I2C bus 401 or the service processor 402. It also generates messages on the initiative of the system management signals from the I/O hubs 404a and 404b to the service processor 402, or the I2C bus 401 for communication to other boxes in the complex. The message generation is also under control of the settings in the local reset routing matrix 407 and LDTSTOP routing matrix 408.

Figure 5:
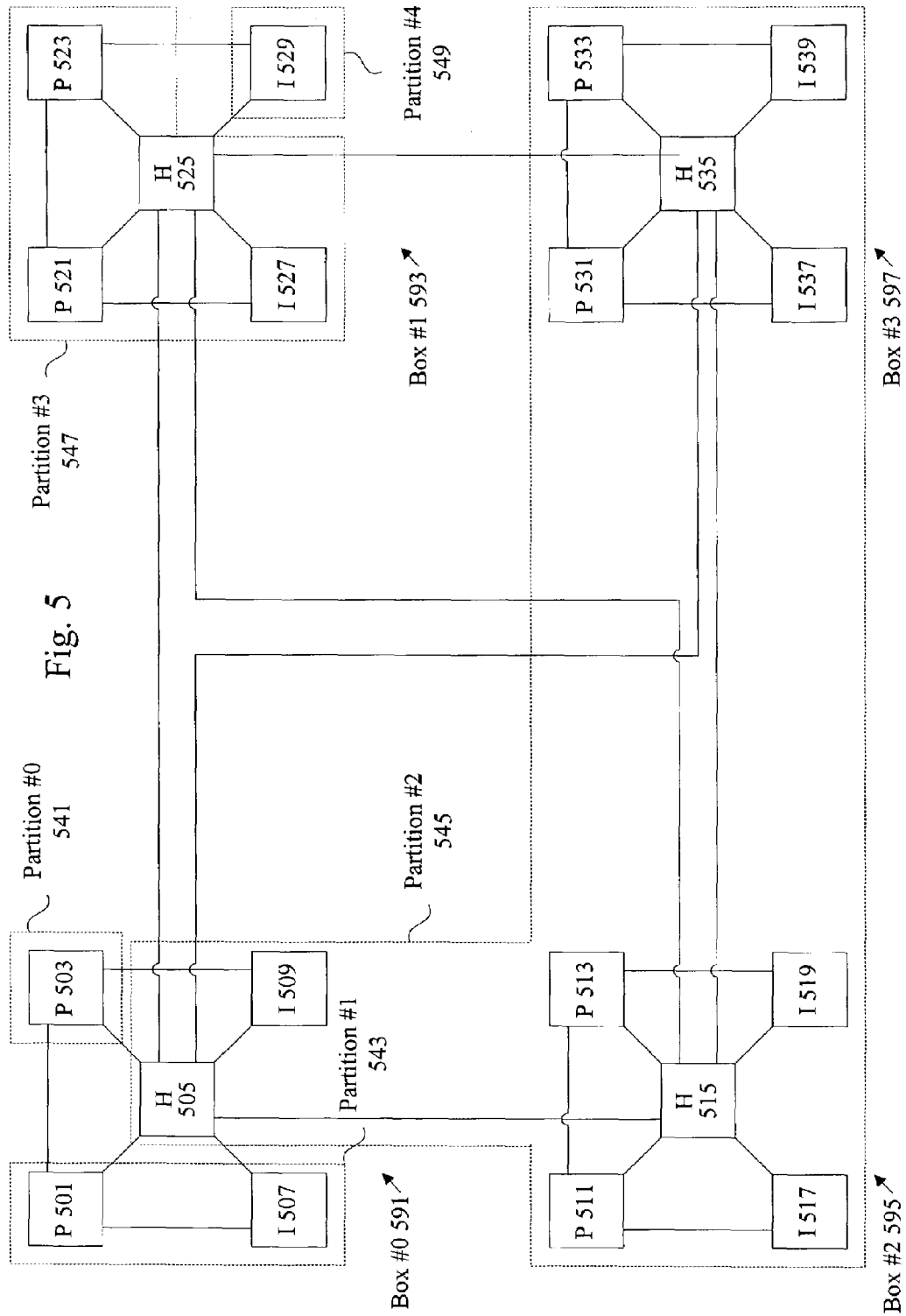
FIG. 5 is a diagrammatic representation of multiple partitions distributed across multiple clusters.

FIG. 5 is a diagrammatic representation showing the computer system complex including multiple boxes and multiple partitions. Any system including multiple boxes is referred to herein as a computer system complex. Box 591 includes processors 501 and 503, interconnection controller 505, and processor and I/O resources 507 and 509. Box 595 includes processors 511 and 513, interconnection controller 515, and processor and I/O resources 517 and 519. Box 593 includes processors 521 and 523, interconnection controller 525, and processor and I/O resources 527 and 529. Box 597 includes processors 531 and 533, interconnection controller 535, and processors and processor and I/O resources 537 and 539. The processors in the computer system complex are interconnected using point-to-point links through interconnection controllers residing within each box.

It should be noted that boxes 591, 593, 595, and 597 also include other resources such as service processors and I/O hubs. The service processor associated with each box communicates with service processors in other boxes, typically using an internal Ethernet connection. According to various embodiments, one of the service processors is designated as the primary service processor (PSP) and all other service processors are designated secondary service processors (SSPs). In one implementation, the secondary service processors communicate only with the primary service processor. The primary service processor communicates not only with secondary service processors, but also a management console and other external mechanisms. According to various embodiments, boxes 591, 593, 595, and 597 each include a service processor.

According to various embodiments, other lines are also used to connect the various boxes. In this embodiment, a dedicated line is provided to connect resources in various boxes to allow for the transmission of the power management signal LDTSTOP. In one embodiment, service processors are configured to partition the resources in each box based on particular user needs. In one example, box 591 includes resources for partition 543, partition 545, and partition 541. Box 595, however, includes only resources allocated in a single partition 545.

In many typical implementations, a box containing some number of processors and other resources has system management signals that apply to all of the resources in the box. The techniques of the present invention allow for partitioning of the resources in the box into multiple individual partitions, each capable of running its own operating system. For example, box 593 includes resources for both partition 547 and 549. In one example, if an operating system running in partition 549 signals for a reset of the resources in box 593, typical implementations would reset all the resources in box 593 including resources for partition 547 associated with a separate operating system. The reset would occur even if the operating system running on partition 547 did not request any reset of resources. The techniques of the present invention allow all of the various partitions to apply system management operations such as reset or power management functions to resources that are part of the partition, even if resources of other partitions reside within the same box.

In another example, resources in partition 545 may need to signal resources in other boxes to affect the same system management operations because other resources associated with partition 545 reside outside of the local box. The techniques of the present invention allow the control of system management functions such that only appropriate resources are affected. The control of the system management functions can be changed dynamically to accommodate the addition and removal of resources in particular boxes and partitions. More information about setting up routing tables is described in U.S. patent application Ser. Nos. 10/157,384, filed May 28, 2002, entitled "Transaction Management In Systems Having Multiple Multi-Processor Clusters", by David B. Glasco, Carl Zeitler, Rajesh Kota, Guru Prasadh, and Richard R. Oehler; U.S. patent application Ser. No. 10/156,893, Filed May 28, 2002, entitled "Routing Mechanisms In Systems Having Multiple Multi-Processor Clusters", by David B. Glasco, Carl Zeitler, Rajesh Kota, Guru Prasadh, and Richard R. Oehler; and U.S. patent application Ser. No. 10/157,409, May 28, 2002, entitled "Address Space Management In Systems Having Multiple Multi-Processor Clusters", by David B. Glasco, Carl Zeitler, Rajesh Kota, Guru Prasadh and Richard R. Oehler.

FIG. 6 is a diagrammatic representation of a general routing table that can be used to distribute system management signals. Any logic or mechanisms for distributing system management signals to other boxes in a computer system complex is referred to herein as a general routing table. According to various embodiments, a general routing table is used to distribute system and power management signals using existing interfaces such as Ethernet or I2C interfaces. Any logic or mechanisms for distributing system management signals to specific resources within a box is referred to herein as a local routing table.

A general routing table 600 is associated with a service processor or other components in a box to allow the box to route system management signals to the appropriate boxes in the complex. According to various embodiments, partition numbers are used to identify entries in the general routing table 600. In one embodiment, a computer system complex including four boxes each with four processors has a maximum of 16 partitions. In the embodiment shown in FIG. 5, five partitions are provided. The five partitions are identified by entires 601-609. A slot number as shown in column 613 can be used to reduce the number of bits sent from box to box. In one example, a first box sending a system management signals to a second box identifies the partition number so that the second box can apply the system management signal to only resources in that partition.

If a first box indicates that partition 3 resources should be reset, a second box would apply the reset to partition 3 resources. However, in a complex using a large number of partitions, it becomes inefficient to send a large bit sequence to represent each of the possible partitions when each box can only have a much smaller maximum number of partitions. In one example, a box with four processors could only have a 4 possible partitions. According to various embodiments, the techniques of the present invention provide a slot number to identify the actual partition that a system management signal should be applied to. An individual box could map the slot number onto an actual partition number to determine the actual partition. Alternatively, the box need not even know the partition number and may simply apply the system management signal to resources associated with a particular slot number.

In one example, box 0 includes resources for partitions 541, 543, and 545. When a system management signal is received, the partition number associated with the system management signal is identified and a general routing table is accessed using the partition number. If box 0 as shown in FIG.

5 receives a system management signal associated with partition number 2, entry 605 is accessed to determine that the system management signal should be applied to box 0 slot number 2. In other words, the system management signal is applied to resources in box 0 associated with the slot number 2. However, other boxes also include resources associated with partition number 2. A system management signal is sent to addresses provided in entry 605. In one example, partition number 2 resources are also included in boxes 2 and 3. The general routing table 600 provides the Ethernet and/or Inter-Integrated Circuit (I2C) addresses of boxes 2 and 3. A variety of mechanisms such as Ethernet and I2C can be used to interconnect the boxes in the complex.

In another example, box 0 receives a system management signal associated with partition number 4. Using entry 609, box 0 recognizes that the system management signal should be routed to box 1 slot 1. According to various embodiments, box 0 sends a message with an Ethernet address or an I2C address identified in entry 609 with information indicating the system management function to be applied as well as a slot number that the system management function should be applied to.

According to various embodiments, a general routing table is used by a primary service processor to distribute system management signals to various boxes. In one implementation, all system management signals are first routed to the primary service processor. The primary service processor then distributes the system management function to secondary service processors based on the general routing table. Although service processors here are used to distribute the various signals, it should be recognized that other mechanisms such as I2C interfaces can be used to distribute system management signals as well. In the example where primary and secondary service processors are used, system management signals are distributed to the selected secondary service processors. When the boxes associated with the secondary service processors receive the system management signals, local routing tables are used to distribute the system management signals to various resources within each box.

FIGS. 7A and 7B are diagrammatic representations showing local routing tables that can be used to distribute system management signals to resources within a box. FIG. 7A shows a local routing table for box 0. According to various embodiments, a configuration system module associated with a service processor receives the system management signal. In one example, the system management signal is a request to reset resources associated with the partition. Using a local routing table, a configuration system module determines partition number information or slot number information associated with the system management signal. In one example, the partition number or slot number is 1. Entry 705 is then accessed to determine the resources to reset.

According to various embodiments, the system management signal may originate from one of several I/O hubs, from a service processor, or from an I2C interface. Routing table 701 indicates that a system management signal associated with slot number 1 may originate from I/O hub 1, a service processor, or an I2C interface. The entry 705 indicates that a reset signal should be asserted on lines associated with processor and I/O resource 0, and processor 1. It should be noted that system management signals within a box are typically asserted on various lines. Resources such as processors typically have reset pins and other system management pins. On the other hand, system management signals are sent typically as messages from a first box to a second box. Messages typically include an action type, slot number information, and an assert/de-assert bit. According to various embodiments, the slot number is mapped at configuration time from the partition number. In one example, the assert/de-assert bit is used to control the length of the reset action. The assert bit is turned on in the message to begin a reset action and the action is terminated in a subsequent message when the assert bit is turned off (de-asserted).

Routing table 711 is associated with box 1. As shown in FIG. 5, box 1 includes resources for partition 3 and partition 4. Partition 3 and partition 4 can be mapped to slot numbers 0 and 1. When a system management signal is received at box 1, a partition number or slot number is identified to access an entry in the local routing table 711. If the slot number is 1, the system management signal was generated by I/O hub 3, a service processor, or an I2C interface. Based on the routing table entry 715, the system management signal is asserted on a line associated with processor and I/O resource 3. Routings tables 721 and 731 are used for boxes 2 and 3 respectively. As shown in FIG. 5, boxes 2 and 3 include only partition 2 resources. Consequently, system management signals received by boxes 2 and 3 would be applied to all the resources in each box, where all resources in the boxes are part of partition 2. Entries 723 and 733 indicate that when a system management signal is received, system management signals are asserted on lines associated with processor and I/O resources 0 and 3, processors 1 and 2, and the interconnection controller.

According to various embodiments, the resets across boxes are sequenced so that the reset action on the boot strap processor envelops the reset action of all other resources of the partition in other boxes. In one embodiment, the boot strap processor is the last to de-assert the reset action. Typical assertion times are greater than 1 ms.

System management signals such as reset signals may arise from several different sources. In one example, a system reset signal stems from an I/O hub. In this case, the resources belonging to the partition in the same box as the I/O hub see reset signals asserted by the I/O hub. The signals are an initiative to the boot strap processor secondary service processor to send a request message to the primary service processor to initiate the appropriate reset for the entire partition. The primary service processor then proceeds to generate reset messages to all the boxes containing resources associated with the partition, starting with the boot strap processor box. The hardware reset signal from the I/O hub is extended in the boot strap processor resource by hardware until the reset message arrives at the boot strap processor secondary service processor by way of the primary service processor. The reset signals, typically sequenced by a state machine, remain asserted until de-asserted by an initiative from the primary service processor.

In another case, a reset initiative arises from a management console. In this case the primary service processor sends the reset message to the boot strap processor service processor to initiate the reset. The reset message is then sent to the other boxes participating in the partition. According to various embodiments, deassertion messages can come in any sequence as long as a message to the boot strap processor is last.

FIGS. 8A and 8B are diagrammatic representations showing LDTSTOP routing tables that can be used to distribute LDTSTOP signals to resources within a box and to other external boxes comprising the complex. Routing table 801 shows an LDTSTOP routing table for box 0. According to various embodiments, a configuration system module associated with a service process processor, I/O hubs, and LDTSTOP signals from other boxes in the complex, receives the LDTSTOP signal from one of these sources. The LDTSTOP signal is used to synchronize frequency and voltage changes in resources associated with the partition. Using the LDTSTOP routing table, a configuration system module determines partition number information or slot number information associated with the LDTSTOP signal. In one example the partition number or slot number is 1. Entry 805, input, enables the permitted sources of LDTSTOP. Entry 805, output, is then accessed to define the resources to which LDTSTOP is sent.

According to various embodiments, the LDTSTOP signal may originate from one of several I/O hubs. LDTSTOP routing table 801, input, indicates that an LDTSTOP signal associated with slot number 1 originates from I/O hub 1. Entry 805, output, indicates that an LDTSTOP signal should be asserted on lines associated with processor and I/O resource 0 and processor 1. Entry 807 input indicates that an LDTSTOP signal originated from an I/O hub in another box, driving External Port 5. Entry 807 output indicates that an LDTSTOP signal should be asserted on lines associated with processor and I/O resource 3 and controller H. It should be noted that LDTSTOP signals within a box are typically asserted on various lines. Each component containing an HT link has an LDTSTOP pin. In some examples, LDTSTOP lines must be asserted in a manner to insure that a period of overlap exists between both ends of a link measured in a small number of microseconds.

Routing table 811 is associated with box 1. As shown in FIG. 5, box 1 includes resources for partition 3 and partition 4. Partition 3 and partition 4 can be mapped to slot number 0 and 1. When an LDTSTOP signal is received at box 1, a partition number or slot number is identified to access and entry in the local routing table 811. If the slot number is 1, the signal was generated by I/O hub 3. Based on the routing table entry 815, the LDTSTOP signal is asserted on lines associated with the components associated with processor and I/O resource 3. Routing tables 821 and 831 are used for boxes 2 and 3 respectively. As shown in FIG. 5, boxes 2 and 3 include only partition 2 resources. Consequently LDTSTOP signals received by boxes 2 and 3 include only partition 2 resources. Consequently, LDTSTOP signals received by boxes 2 and 3 would be applied to all resources in each box, where all resources in the boxes are part of partition 2. Entries 823 and 833 indicate that when an LDTSTOP signal is received, LDTSTOP signals are asserted on lines associated with processor and I/O resources 0 and 3, processor 1 and 2, and the interconnection controller. In some embodiments, entry 833 output also indicates that LDTSTOP should be driven externally on Ports 5 and 6 to active inputs on entries 807 in box 1 and 823 in box 2. LDTSTOP signals typically originate from an I/O hub.

Figure 9A:
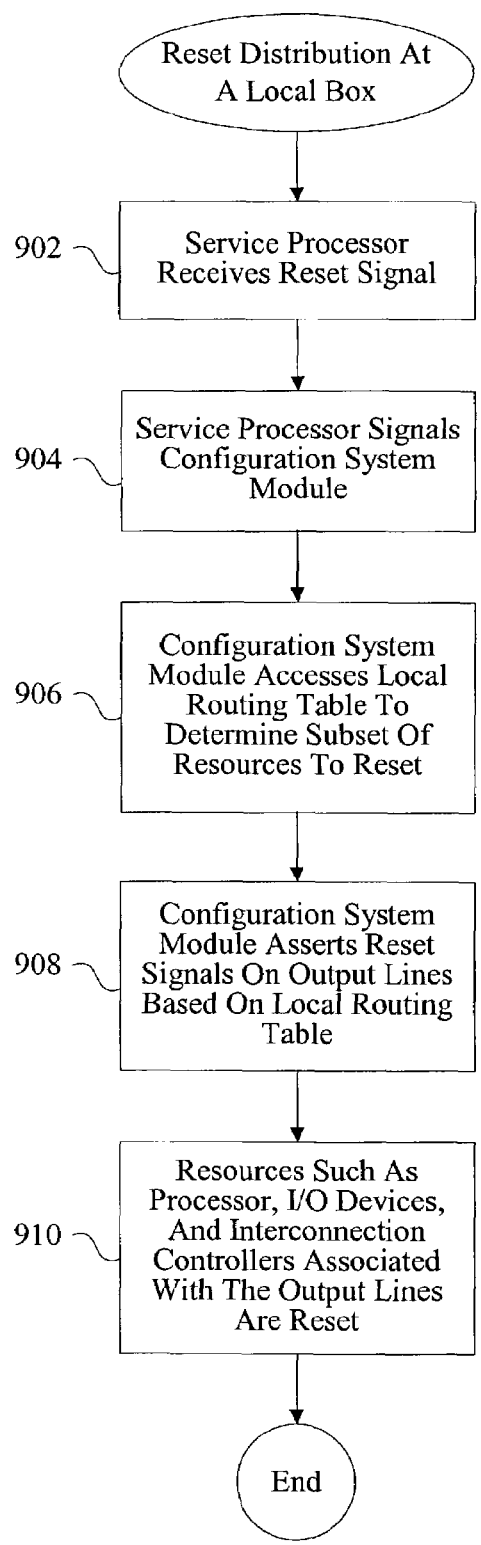
FIG. 9A is a flow process diagram showing a reset at a local cluster.

FIG. 9A is a flow process diagram showing one example of reset distribution at the local box. At 902, a service processor receives a reset signal. At 904, the service processor signals a configuration system module. The configuration system module accesses a local routing table to determine the resources to reset at 906. At 908, the configuration system module asserts reset signals on output lines based on the local routing table. At 910, resources such as processors, VO devices, and interconnection controllers associated with the output lines are reset. According to various embodiments, each box contains logic to convert reset messages, typically distributed by a primary service processor, into a reset action. The reset messages can come from an Ethernet or I2C network. Furthermore, each box can also include a state machine logic to correctly time and toggle reset signals.

Figure 9B:
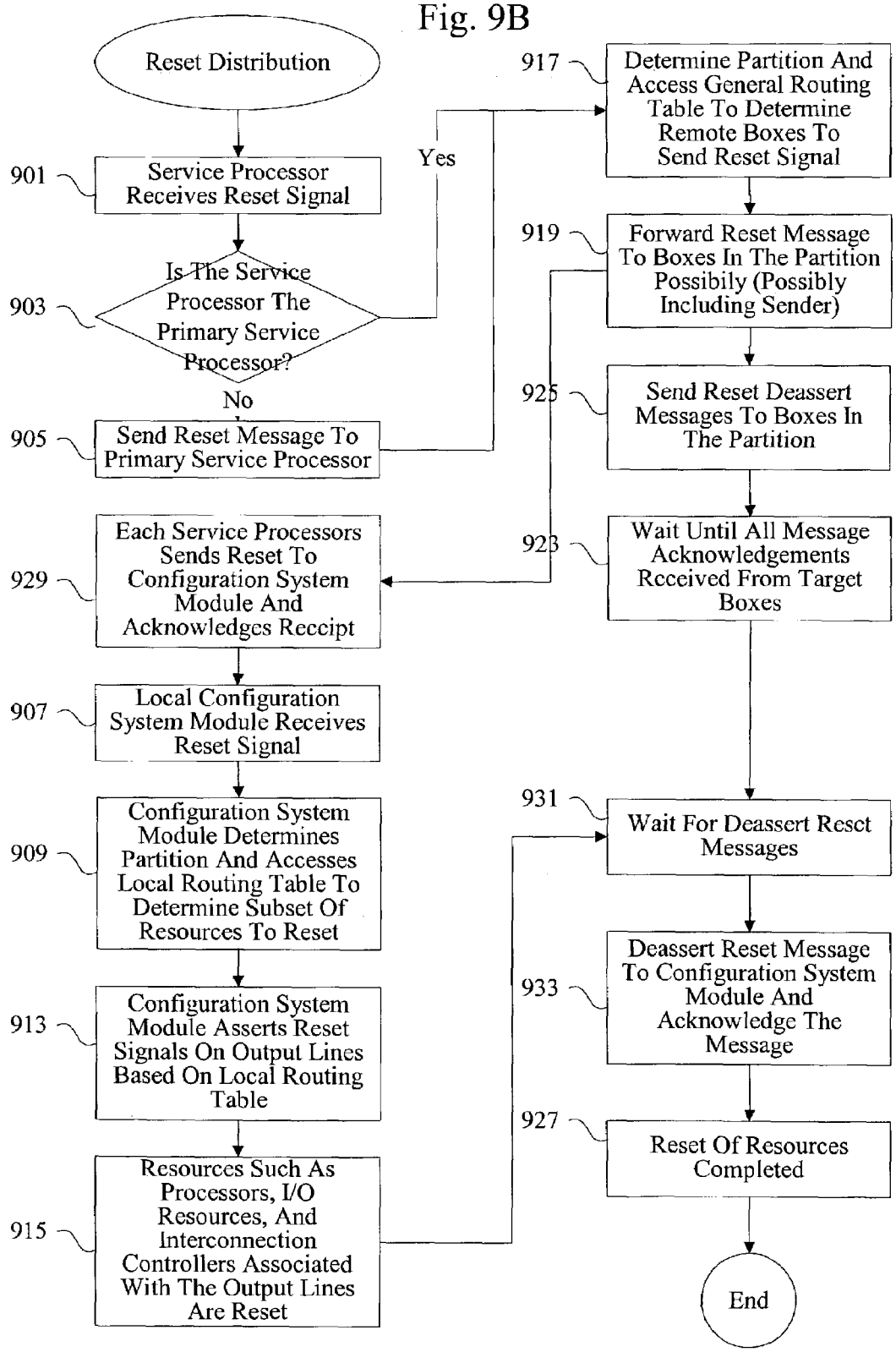
FIG. 9B is a flow process diagram showing a reset transmitted to multiple clusters.

FIG. 9B is a flow process diagram showing one example of reset distribution. At 901, a service processor receives a system management signal such as a reset signal. According to various embodiments, it is determined if the service processor receiving the reset signal is the primary service processor at 903. If the service processor is the primary service processor, the partition associated with the reset signal is determined and the general routing table is accessed to determine remote boxes to send the reset signal. As noted above, communications between boxes are typically in the form of reset messages including assert/de-assert information, slot/partition information, and a signal type. At 919, the reset message is forwarded to remote boxes. If the primary service processor is part of the partition, then it sends the signal to its own configuration system module. At 923, each service processor sends a reset sequence to a configuration system module, waits a short period of time typically greater than one millisecond, and acknowledges the message. The delay allows time for the reset to complete. The primary service processor waits for acknowledgement from the other appropriate secondary service processors.

If it is determined at 903 that the service processor is not the primary service processor, the reset message is sent to the primary service processor. At 907, the local configuration system module receives the reset signal from the local service processor and also in some cases from the I/O hub. At 909, the configuration system module determines the partition/slot and accesses a local routing table to determine the subset of resources to reset. In one instance, all resources in the box are reset while in some other instances some of resources are reset. At 913, the configuration system module asserts reset signals on output lines based on a local routing table. At 915, resources such as processors, processor and I/O resources, and interconnection controllers associated with the output lines are reset. At 925, the de-assert reset message is sent to boxes in the partition to complete the reset. At 931, the secondary service processor waits for the reset deassertion message, deasserts the reset signal to the configuration system module and acknowledges the message. Typically, the reset de-assert signal to the boot strap processor is sent last. At 927, the reset of resources is completed.

Although the techniques of the present invention allow for the distribution of reset signals using service processors, it should be noted that a variety of other signals and mechanisms can be used. For example, other system management signals such as power management signals can be sent to various resources to manage the amount of power consumed in a computer system complex. Several types of power management signals are available. In one example, signals can be sent to processors by an operating system to manage processor performance states. Processors associated with a particular partition can run at a lower frequency (clock speed) and voltage when an OS determines that a partition should be running in a low power mode. In another example, signals can be sent to place various resources in sleep states. A wide variety of sleep states are available. Methods and apparatus for power management are described in U.S. patent application Ser. No. 10/188,271, filed Jul. 1, 2002, entitled "Methods And Apparatus For Power Management" by Richard R. Oehler, Carl Zeitler, and Richard O. Simpson.

In one sleep state, complete system context and machine state are preserved but voltage is reduced and clocks are stopped to reduce power consumption. No reset is involved. Entry into the sleep state can be performed by an I/O hub associated with the partition. Wakeup is controlled by a primary service processor. In a second sleep state, power is removed from the processor and all I/O devices. Memory contents are maintained by placing the memory in self refresh mode. The second sleep states allows a greater power savings then the first sleep state, but the time to exit or wakeup is longer. In a third sleep state, all necessary state information is saved to disk and subsequently restored on reboot. In still another state, no status is saved. In most cases, more time is needed to restore the system to an operational state from sleep states that allow for greater power savings. It should be noted that a variety of sleep states can be used with the techniques of the present invention.

According to various embodiments, signals such as power management signals can be handled locally using components such as I/O hubs and service processors. In one example, signaling local resources is governed by local routing tables. Power management messages sent to other boxes are simply broadcasts to other boxes without using a global routing table. Components at a local box are then controlled by the local reset routing matrix to determine whether the power management signal should be forwarded to local components. In this embodiment, the LDTSTOP signal is sent via wires to other boxes. Components at a local box are then controlled by the LDTSTOP routing matrix.

Figure 10:
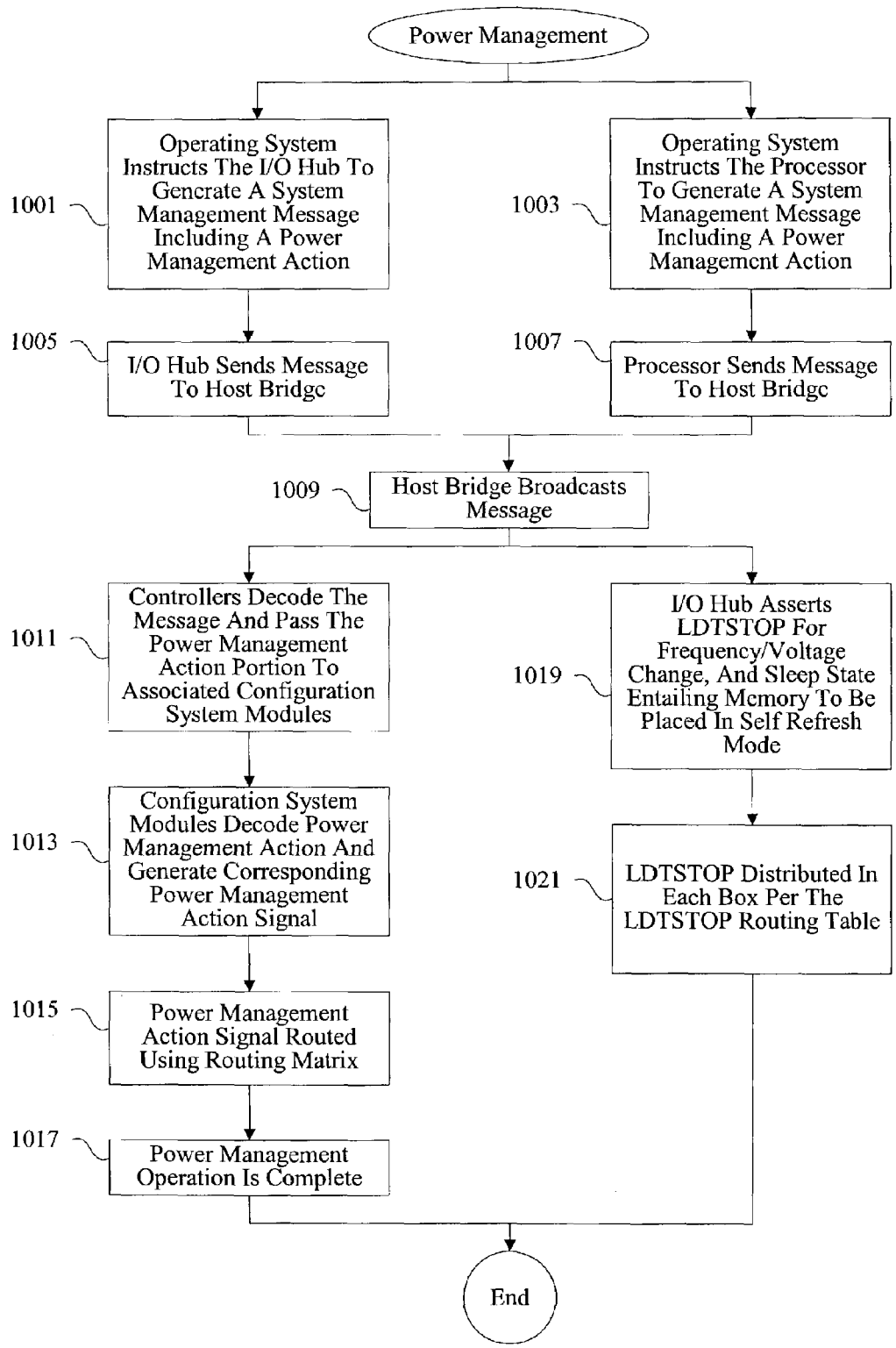
FIG. 10 is a flow process diagram showing a technique for distributing power management information over a coherent interface.

FIG. 10 is a flow process diagram showing an example of power management. At 1001, the operating system issues an instruction that orders the I/O hub to generate a system management message packet containing a power management action code describing a particular sleep state. At 1005, the I/O hub sends a message packet to the host bridge. The host bridge translates the message packet format received from the I/O hub in the non-coherent domain to the coherent-domain.

At 1003, the operating system issues an instruction that orders the processor to generate a system management message containing a power management action code describing a change in power. At 1007, the processor sends the message to the host bridge. It should be noted that the service processor or a management console can also direct the operating system to initiate a management action. At 1009, the host bridge broadcasts the message to all boxes and all nodes in the boxes in the partition. At 1011, the local controller in each box decodes the system management message and passes the power management action portion to the configuration system module. At 1013, the configuration system module decodes the power management action and generates the proper power management signal to effect the power management action.

At 1015, the power management signal is routed to the nodes specified in the local reset routing matrix. At 1017, the power management operation is complete. By using the existing coherent interface to send power management notifications, the need to install an additional communication mechanism is eliminated, enhancing reliability and simplifying cable management.

At 1019, the I/O hub, in proper timing with the message broadcast, asserts the LDTSTOP signal. According to various embodiments, this signal is distributed to all boxes using physical wires. In some examples, LDTSTOP is only asserted for frequency and voltage change and for the sleep states where complete system state is preserved and where system state is maintained in memory. At 1021 the LDTSTOP signal in a particular box, is routed using the LDTSTOP routing table to the appropriate components.

According to various embodiments, wakeup events are routed to local I/O hubs and also to local service processors associated with configuration system modules. If other boxes belong to the partition, the wakeup events to local I/O hubs are blocked, in order to allow the primary service processor to perform the appropriate sequencing of the wakeup events. According to various embodiments, the sleep and wakeup events are transmitted between boxes using service processor messaging using mechanisms such as Ethernet or I2C.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with multiple processor clusters connected through a point-to-point, switch, or bus architecture. In another example, multiple clusters of processors may have multiple service processors. Therefore, the scope of the invention should be determined with reference to the appended claims.

What is claimed is:

1. A computer system, comprising:
   a plurality of local resources including a local cluster of processors in a local box, the local cluster of processors interconnected in a point-to-point architecture;
   a plurality of remote resources including remote clusters of remote processors in remote boxes, the remote clusters of processors interconnected in point-to-point architectures;
   a routing table having partition information used to configure the local and remote resources into one or more partitions, wherein partition information can configure multiple partitions within a single box and a single partition across multiple boxes;
   wherein a first line between the local box and a remote box is configured to distribute system management signals based on partition information in the routing table and a second line between the local box and the remote box is configured to distribute memory data based on partition information in the routing table.

2. The computer system of claim 1, wherein resources in the local box and the remote boxes are configurable as one or more partitions.

3. The computer system of claim 1, wherein the first line is configured to carry system management signals to only resources in a particular partition, even if multiple partitions reside on a single box.

4. The computer system of claim 1, wherein the first line is configured to carry system management signals to only resources in a particular partition, even if the same partition resides on a plurality of boxes.

5. The computer system of claim 1, wherein the system management signals comprise power management signals.

6. The computer system of claim 1, wherein the system management signals consist of power management signals.

7. The computer system of claim 1, wherein the system management signals comprise data transport stop and data transport request signals.

8. The computer system of claim 5, wherein the system management signals comprise LDTSTOP signals.

9. The computer system of claim 8, wherein LDTSTOP signals are used to synchronize frequency and voltage changes in resources associated with a partition.

10. The computer system of claim 9, wherein an LDTSTOP routing table is used to determine partition information associated with the LDTSTOP signals.

11. The computer system of claim 10, wherein the LDTSTOP routing table is used to forward the LDTSTOP signal to a subset of remote resources in remote boxes.

12. A method for distributing system management signals, the method comprising:
    receiving a system management signal at a configuration system module associated with a local cluster of processors configured in a point-to-point architecture in a local box;

referencing a routing table having partition information used to configure the local and remote resources into one or more partitions, wherein partition information can configure multiple partitions within a single box and a single partition across multiple boxes;

determining using the routing table which local resources and remote resources associated with remote boxes should receive the system management signal; and distributing the system management signal to selected local and remote resources using a first line configured to carry system management information, wherein a second line is configured to carry memory data, wherein the system management information and the memory data is distributed using partition information.

13. The method of claim 12, wherein the local and remote resources comprise processors, controllers, and I/O resources.

14. The method of claim 12, wherein the routing table is an LDTSTOP routing table.

15. The method of claim 12, wherein resources in the local box and the remote boxes are configurable as one or more partitions.

16. The method of claim 12, wherein the lines can be configured to carry system management signals to only resources in a particular partition, even if multiple partitions reside on a single box.

17. The method of claim 12, wherein the dedicated lines are configurable to carry system management signals to only resources in a particular partition, even if the same partition resides on a plurality of boxes.

18. The method of claim 12, wherein the system management signals comprise power management signals.

19. The method of claim 12, wherein the system management signals consist of power management signals.

20. The method of claim 12, wherein the system management signals comprise data transport stop and data transport request signals.

21. The method of claim 18, wherein the system management signals comprise LDTSTOP signals.

22. The method of claim 21, wherein LDTSTOP signals are used to synchronize frequency and voltage changes in resources associated with a partition.

23. The method of claim 22, wherein an LDTSTOP routing table is used to determine partition information associated with the LDTSTOP signals.

24. The method of claim 23, wherein the LDTSTOP routing table is used to forward the LDTSTOP signal to a subset of remote resources in remote boxes.

25. A multiple processor box, comprising:
means for receiving a system management signal at a configuration system module associated with a local cluster of processors configured in a point-to-point architecture in a local box;

means for referencing a routing table having partition information used to configure the local and remote resources into one or more partitions, wherein partition information can configure multiple partitions within a single box and a single partition across multiple boxes;

means for determining using the routing table which local resources and remote resources associated with remote boxes should receive the system management signal; and means for distributing the system management signal to selected local and remote resources using a first line configured to carry system management information, wherein a second line is configured to carry memory data, wherein the system management information and the memory data is distributed using partition information.

26. The multiple processor box of claim 25, wherein the local and remote resources comprise processors, controllers, and I/O resources.

27. The multiple processor box of claim 25, wherein the routing table is an LDTSTOP routing table.

28. A method for distributing system management information, the method comprising:
identifying a plurality of local components including a local cluster of processors in a local box, the local box coupled to a remote box having a remote cluster of processors;

receiving an instruction to generate a data transport signal; and accessing a data transport routing table, the data transport routing table having partition information used to configure the local and remote resources into one or more partitions, wherein partition information can configure multiple partitions within a single box and a single partition across multiple boxes, the data transport routing table configured to allow distribution of system management information to resources associated with particular partitions;

forwarding the data transport signal to the remote box, wherein a first line between the local box and a remote box is configured to distribute system management signals based on partition information in the routing table and a second line between the local box and the remote box is configured to distribute memory data based on partition information in the routing table.

29. The method of claim 28, wherein the data transport signal is a request to change processor voltage and frequency.

30. The method of claim 28, wherein the data transport signal is a request to change link width and frequency.

31. The method of claim 28, wherein the data transport signal is a request to enter a particular sleep state.

32. The method of claim 28, wherein the local cluster of processors are interconnected using point-to-point links.

33. A computer system, comprising:
means for identifying a plurality of local components including a local cluster of processors in a local box, the local box coupled to a remote box having a remote cluster of processors;

means for receiving an instruction to generate a data transport signal; and means for accessing a data transport routing table, the data transport routing table having partition information used to configure the local and remote resources into one or more partitions, wherein partition information can configure multiple partitions within a single box and a single partition across multiple boxes, the data transport routing table configured to allow distribution of system management information to resources associated with particular partitions;

means for forwarding the data transport signal to the remote box, wherein a first line between the local box and a remote box is configured to distribute system management signals based on partition information in the routing table and a second line between the local box and the remote box is configured to distribute memory data based on partition information in the routing table.

34. The computer system of claim 33, wherein the data transport signal is a request to change processor voltage and frequency.

35. The computer system of claim 33, wherein the data transport signal is a request to change link width and frequency.

36. The computer system of claim 33, wherein the data transport signal is a request to enter a particular sleep state.

37. The computer system of claim 33, wherein the local cluster of processors are interconnected using point-to-point links.

* * * * *